(12) United States Patent
Han et al.

(10) Patent No.: US 6,419,975 B1
(45) Date of Patent: Jul. 16, 2002

(54) PROCESS FOR MAKING CASEINLESS CREAM CHEESE-LIKE PRODUCTS

(75) Inventors: Xiao-Qing Han; John A. Gregg, both of Naperville; Ted Riley Lindstrom, Lake Forest; Jimbay P. Loh, Green Oaks, all of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/696,053

(22) Filed: Oct. 25, 2000

(51) Int. Cl.$^7$ ................................................. A23C 19/00
(52) U.S. Cl. ...................... 426/582; 426/519; 426/580; 426/613
(58) Field of Search .................. 426/580, 582, 426/656, 657, 615, 629, 634, 519, 601, 602, 613

(56) References Cited

U.S. PATENT DOCUMENTS

| | | | | |
|---|---|---|---|---|
| 3,620,757 A | | 11/1971 | Ellinger et al. ................. 99/54 |
| 3,857,970 A | | 12/1974 | Tsumura et al. ............... 426/46 |
| 3,889,001 A | | 6/1975 | Buide et al. .................. 426/565 |
| 4,105,803 A | * | 8/1978 | Peng .......................... 426/583 |
| 4,234,620 A | | 11/1980 | Howard et al. ............... 426/656 |
| 4,346,122 A | | 8/1982 | Orthoefer et al. ............ 426/656 |
| 4,349,576 A | | 9/1982 | Lehnhardt et al. ........... 426/582 |
| 4,360,535 A | | 11/1982 | Darling et al. ............... 426/570 |
| 4,435,438 A | | 3/1984 | Lehnhardt et al. ........... 426/656 |
| 4,492,714 A | | 1/1985 | Cooper et al. ............... 426/602 |
| 4,556,569 A | * | 12/1985 | Brander et al. .............. 426/104 |
| 4,696,826 A | | 9/1987 | Leusner et al. .............. 426/565 |
| 5,433,970 A | | 7/1995 | Wong et al. ................. 426/633 |
| 5,462,759 A | | 10/1995 | Westerbeek et al. ......... 426/568 |
| 5,486,375 A | | 1/1996 | Yoder et al. ................. 426/582 |
| 5,945,528 A | | 8/1999 | Sommermeyer et al. ...... 536/45 |

* cited by examiner

*Primary Examiner*—Leslie Wong
(74) *Attorney, Agent, or Firm*—Fitch, Even, Tabin & Flannery

(57) ABSTRACT

The invention is directed to a cream cheese-like product where non-casein protein replaces casein protein and a method for making such product. More specifically, the invention is directed to a process which is effective for making a cream cheese-like product substantially free of casein, wherein the process comprises: mixing (1) proteins other than milk caseins, (2) fat such as butter fat or other food grade fat, and (3) water to form a mixture; subjecting the mixture to a first homogenization to form a protein matrix stabilized emulsion system; heating the protein matrix stabilized emulsion system to a temperature effective to denature the proteins to form a denatured protein matrix stabilized emulsion; adjusting the pH of the denatured protein matrix stabilized emulsion to about 4 to about 6; subjecting the pH-adjusted emulsion to a second homogenization to form the cream cheese-like product; and packaging the cream cheese-like product. Optional ingredients such as stabilizers (e.g., gums), other emulsifiers, salts, coloring, and flavorings can be added to the mixture or to the emulsion (i.e., prior to the first or the second homogenization step).

14 Claims, 1 Drawing Sheet

PROCESS FOR MAKING CASEINLESS CREAM CHEESE-LIKE PRODUCTS

FIELD OF THE INVENTION

The present invention is directed to a cheese-like product and its method of manufacture. More particularly, this invention is directed to a cream cheese-like product which is substantially casein free and which is made using an emulsion based, curdless and wheyless process.

BACKGROUND OF THE INVENTION

Natural cheese is generally made by adding a microorganism to milk which is capable of metabolizing lactose to produce lactic acid and developing acidity. The milk is usually set with a milk clotting enzyme, such as rennet, or by developing acidity to the isoelectric point of the protein. When the set milk is cut, whey separates and is recovered from the resulting curd. The curd may be pressed to provide a cheese block in which curing generally takes place over a period of time under controlled conditions. A product having flavor and body characteristics of natural cheese has been made by replacing at least a portion of the animal fat of the milk with vegetable fat and/or by replacing at least a portion of the casein of the milk with a vegetable protein. Such cheeses are generally referred to as "analog cheese."

Casein has generally been considered as an essential protein component for making natural cheese products. Because of its taste and functionality, casein and caseinates, such as sodium caseinate, have made casein one of the most widely used protein source in foods, such as cheese, cheese products, whipped toppings, and coffee whiteners. This has increased both demand and cost for casein and caseinates. Further, the production of whey as a by-product from cheese making creates a whey protein source which generally is under utilized. Moreover, the use of vegetable protein, such as soy protein, and particularly, soy protein isolates for making cheese products provides a plentiful and inexpensive source of protein for cheese-like products, especially compared to casein as a source of protein.

Therefore, it would be desirable to provide a continuous process using non-casein protein (i.e., alternative protein) to make a cheese-like product with acceptable texture and firmness. It would also be desirable to provide such a process wherein neither curd nor whey are produced. It would also be desirable to provide an emulsion-based, essentially casein-free, continuous process which is continuous and uses inexpensive starting materials which are generally under utilized by-products of other food-making processes. It would also be desirable to provide a cheese-like product from alternative proteins which are substantially free of casein. It would also be desirable to provide a process for making a cheese-like product where the process does not produce curd or whey. It would also be desirable to provide a continuous process which makes a cheese-like product which utilizes a non-casein protein source. The present invention provides these advances as well as other advantages as can be seen by reference to the following specification.

SUMMARY OF THE INVENTION

The present invention provides a cheese-like product where non-casein protein (i.e., alternative protein not containing casein) replaces casein protein, and in an important aspect, substantially completely replaces casein in a cheese-like product. The present invention also provides a process which does not produce whey, but which may utilize whey protein. The present invention also provides a curdless process that does not produce curd and which is a solely emulsion-based. The present invention also provides a continuous process. The present invention also provides a process which combines high pressure homogenization and heat treatment to enhance or extend emulsifying capacity and which forms an irreversibly heat denatured protein matrix stabilized emulsion. The present invention also provides a process which denatures proteins in the emulsion system before acidifying the system.

The present process does not require dairy caseins to build texture. Thus, other food proteins (e.g., whey protein, soy proteins and their combinations) may be used as protein sources to produce caseinless cream cheese-like products with similar texture (i.e., firmness and smoothness) as conventional cream cheese. In an important aspect, the process of the invention produces soy-based cream cheese-like products. In a very important aspect, the process of the invention substantially completely replaces casein with soy-based protein. In another important aspect, the process of the invention utilizes whey protein in lieu of casein. And in a very important aspect, the process of the invention whey protein substantially completely replaces casein. Further advantages of the invention include (1) significant productivity saving because no casein is required in the formula; (2) elimination of processes for the treatment of by-product acid whey with substantial cost savings; (3) a simplified process with shorter processing times; and (4) minimized syneresis of final products. Importantly, products prepared by the present invention using soy protein as the only protein source essentially exhibit no syneresis at room temperature for up to about 20 hours.

The invention includes a cheese-like product that is substantially free of casein. The invention also includes a process which is effective for making a cream cheese-like product substantially free of casein, wherein the process comprises: mixing (1) proteins other than milk caseins, (2) melted fat such as butter fat or other food grade fat, and (3) water at abpit 120 to about 170° F. to form a mixture; subjecting the mixture to a first homogenization to form a protein matrix stabilized emulsion system; heating the protein matrix stabilized emulsion system to a temperature effective to denature the proteins to form a denatured protein matrix stabilized emulsion; adjusting the pH of the denatured protein matrix stabilized emulsion to about 4.0 to about 6.0; subjecting the pH-adjusted emulsion to a second homogenization to form the cream cheese-like product; and packaging the cream cheese-like product. Optional ingredients such as stabilizers (e.g., gums), other emulsifiers, salts, coloring, and flavorings can be added to the mixture or to the emulsion (i.e., prior to the first or the second homogenization step).

In an important aspect, the first homogenization is preferably carried out in a two-stage homogenizer wherein the first stage is at least about 1000 psi and generally about 1000 to about 5000 psi and wherein the second stage is at least about 300 psi and generally about 300 to about 1000 psi.

In another important aspect, the protein matrix stabilized emulsion system is heated to at least about 155° F. for at least about 5 minutes, and generally from about 155 to about 195° F. for about 5 to about 80 minutes, to denature the protein.

In another important aspect, the pH of the denatured protein matrix stabilized emulsion is adjusted with food grade acids to the desired acidity level of about pH 4.0 to about 6.0 during or after denaturing step.

In another important aspect, the second homogenization of the pH-adjusted emulsion is also preferably carried out in a two-stage homogenizer wherein the first stage is at least about 1500 psi and generally about 3000 to about 6000 psi, and wherein the second state is at least about 300 psi and generally about 300 to about 1000 psi.

Finally, in another important aspect, the packaging is effected by hot packing and the hot packed cream cheese-like product is cooled to refrigeration temperatures. Preferably, the temperature of the cream cheese-like product is about 120 to about 170° F. for hot packing.

DETAILS OF THE INVENTION

Figure 1:
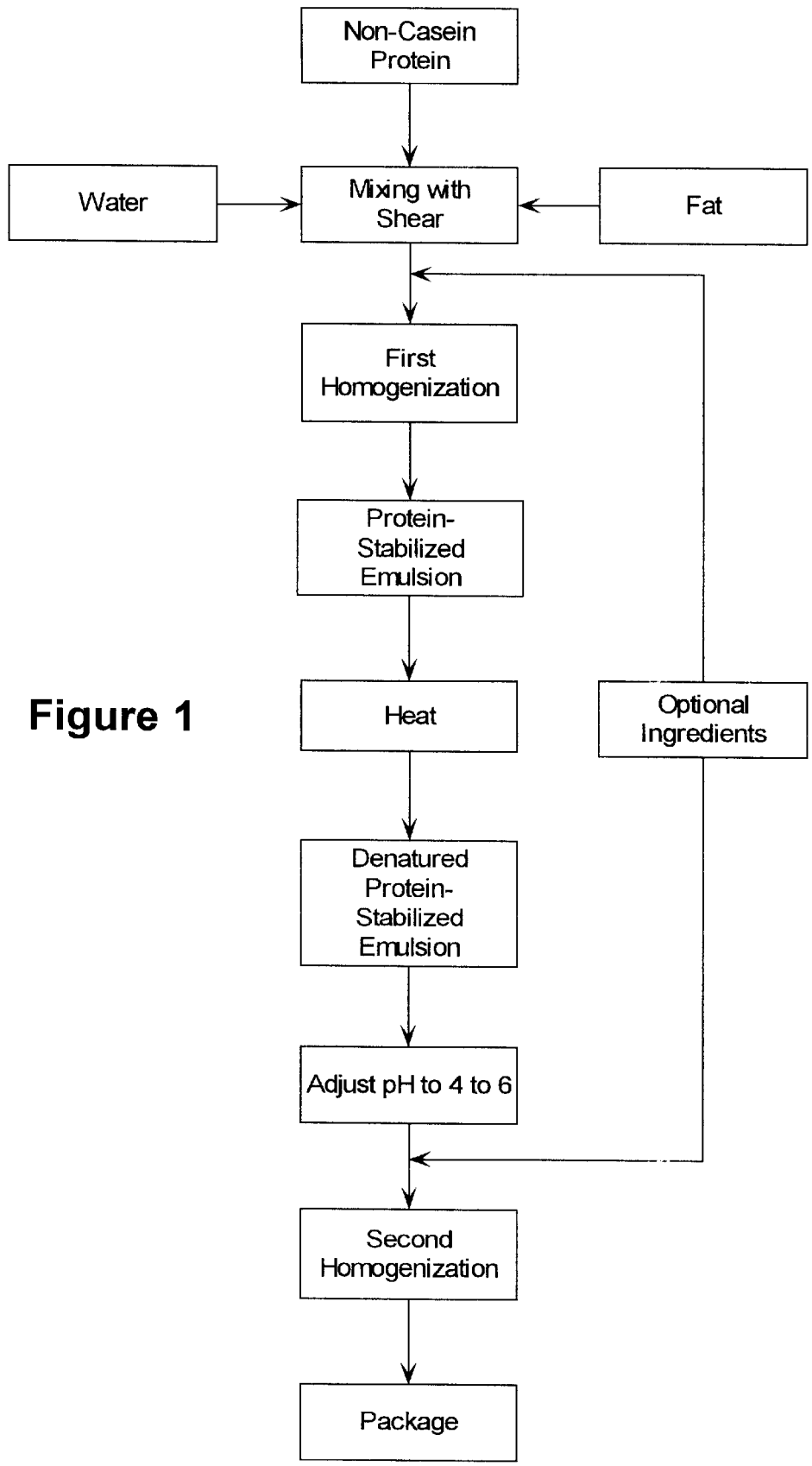
FIG. 1 is a schematic diagram of the process of the invention.

As used herein, "casein" means a blend of polypeptides or proteins present in milk, or which is precipitated by acid from milk (acid casein), or which is precipitated from milk by rennet (rennet casein). Although the specific blends of polypeptides or proteins in milk, acid casein, and rennet casein differ, they generally contain $\alpha_{s1}$-casein, $\alpha_{s2}$-casein, $\beta$-caein, $\kappa$-casein, and their genetic variants. In the case of rennet casein, part of $\kappa$-casein has been hydrolyzed during the process of renneting.

"Substantially free of casein" means the final cream cheese-like product has less than about 1 percent casein and/or caseinates, and more preferably less than about 0.5 percent. A "curdless process" is intended to mean a process in which the production of curd and whey is avoided. Such a curdless process does not require, therefore, any whey separation step. "Soy protein isolate" means a material from soy which has at least about 90 percent protein from soy.

For purposes of this invention, "protein matrix stabilized emulsion system" refers to an emulsion system stabilized by a protein matrix in which water molecules are trapped in the matrix (i.e., the continue phase comprises the protein matrix and water). For purposes of this invention, "denatured protein matrix stabilized emulsion" means an emulsion system containing denatured proteins and stabilized by a protein matrix in which water molecules are trapped in the matrix (i.e., the continuous phase comprises the protein matrix and water). The protein concentrations in such matrix stabilized systems are generally higher than conventional protein stabilized emulsion systems. In conventional emulsion systems, proteins are mostly absorbed at the interface and water forms a continue phase with some solubilized proteins. The stability of such a conventional emulsion system, therefore, is limited because the movement of water molecules in the continuous phase will tend to destabilize and/or destroy the emulsion system.

According to the process of the invention, non-casein protein is mixed with hot water (e.g., about 120 to about 170° F.) and melted fat (preferably butter fat). The resulting mixture is then subjected to shear to form a coarse emulsion. Generally, mixing is at a temperature of about 120 to about 170° F. Generally, the mixture is formed with about 3 to about 12 percent non-casein proteins, about 5 to about 35 percent fat, and about 40 to about 80 percent water. More preferably, the mixture is formed with about 4 to about 10 percent non-casein protein, about 15 to about 30 percent fat, and about 45 to about 65 percent water. Suitable non-casein proteins include whey proteins, soy proteins, other legume-based proteins, egg proteins, animal proteins, and mixtures thereof; generally, whey and soy proteins are preferred. Suitable fats include butter fat and other food grade fats such as soy oil, peanut oil, and the like; mixtures of such fats can also be used. The non-casein proteins can act as emulsifiers in forming the desired emulsion. Although additional emulsifiers are not required, they can be used if desired. Suitable emulsifiers include, for example, sodium phosphate, potassium phosphate, sodium citrate, and the like; such emulsifiers can be added prior to first and/or second homogenization steps.

The mixture is then subjected to a first homogenization to form a fine emulsion. Generally, this emulsion has a mean particle size in the range of about 1 to about 100 microns, and more preferably, about 1 to about 20 microns. Preferably, the first homogenization is carried out in a two-stage homogenizer, wherein the first stage is about 1,000 to about 5,000 psi and the second stage is about from 300 to about 1,000 psi. The protein matrix stabilized emulsion system is formed in the first homogenization. Thereafter the protein matrix stabilized emulsion system is heated to a temperature and for a time effective to denature the protein. Generally, the temperature is at least about 155° F., and in an important aspect, about 155° F. to about 195° F. For purposes of this invention, denaturing the protein is intending to mean that at least 80 percent, and more preferably at least 90 percent, of the protein contained in the protein matrix stabilized emulsion system is denatured. The pH of the denatured emulsion is then adjusted to between about 4 to about 6 with food grade acids, such as lactic acid, citric acid, vinegar, and the like. The pH-adjusted emulsion to a second homogenization to form the cream cheese-like product. Preferably, the second homogenization is carried out in a two-stage homogenizer, wherein the first stage is about 1,500 to about 6,000 psi and the second stage is about 300 to 1,000 psi. The cream cheese-like product is packaged using conventional techniques and then cooled to refrigeration temperatures (i.e., about 35 to about 45° F). Preferably, the cream cheese-like product is hot filled in suitable containers (e.g., tubs) at a temperature of about 120 to about 170° F. and then cooled to refrigeration temperatures.

The cream cheese-like products of this invention may also contain additional ingredients such as, for example, salt, emulsifiers, stabilizers, gums, colorings, flavorings, spices, and the like. Suitable emulsifiers include, for example, sodium phosphate, potassium phosphate, sodium citrate, and the like. Suitable gums include, for example, locust bean gum, carrageenan gum, xanthan gum, sodium alginate, carboxymethylcellulose, and the like. Generally such optional ingredients, if used, are present at levels less than about 2 percent. Such optional ingredients can generally be added to the mixture prior to the first homogenization or to the emulsion prior to the second homogenization. Generally it is preferred to add such optional ingredients to the emulsion prior to the second homogenization.

The following examples are provided to illustrate the invention and not to limit it. Unless otherwise indicated, all percentages and ratios are by weight.

EXAMPLE 1

This example illustrates the preparation of a 100 percent whey protein based cream cheese and demonstrates the effect of whey protein denaturation on product texture. The following process was used.

(1) Mix 1.4 kg whey protein (WPC AMPC 800) with 13.2 kg of hot water (about 150° F.) and 4.0 kg of melted anhydrous butter fat;

(2) Homogenize the mixture with a two-stage homogenizer (first stage at 3000 psi and second state at 500 psi);

(3) Heat the homogenized mixture to 160° F. (sample A in Table 1) or to 170° F. (sample B in Table 1 and hold for about 30 minutes);
(4) Add 90 g lactic acid (88%) to the heated mixture to adjust the pH to below 5.0;
(5) Add NaCl (40 g) and xanthan gum (40 g) and then mix; flavorings and/or other optional ingredients can be added at this point if desired;
(6) Homogenize the samples using a two-stage homogenizer (first stage at 4000 psi and second stage at 500 psi);
(7) Hot fill the homogenized samples in cups and seal; and
(8) Store the hot filled samples at 40° F.

Two samples were prepared as summarized in the following Table 1.

TABLE 1

Experimental Design

| Formula | Sample A | Sample B |
| --- | --- | --- |
| WPC AMPC 800 | 1.4 kg | 1.4 kg |
| Anhydrous butter fat | 4.0 kg | 4.0 kg |
| Hot water (about 160° F.) | 13.2 kg | 13.4 kg |
| Salt (NaCl) | 40 g | 40 g |
| Lactic acid (88%) | 90 g | 90 g |
| Xanthan gum | 40 g | 40 g |
| Process | | |
| Heat to temperature | 160° F. | 170° F. |
| Hold for | 30 minutes | 30 minutes |

The results of these experiment are summarized in Table 2. Although whey protein is a by-product from conventional cream cheese production, the developed technology can use it to produce cream cheese-like products. According to the experimental design, the composition target for the final cream cheese product was 6.0 percent protein, 22 percent fat, and 68 percent moisture. Overall, both sample A and B have cold viscosity higher than 3,000 Pa with smooth texture. The actual moisture in sample B is 69.8 (about 1.8 percent higher than target); however, the viscosity of sample B is even higher than that of sample A. This suggests that the heating condition is important to the product texture. Because heat denatured whey protein (especially β-lactoglobulin molecules) could form inter-molecular disulfide linkage (cross-linking), heating condition should be well-controlled.

The invention indicates that although casein contributes to the texture of cream cheese products in conventional process, other proteins are also able to form cream cheese-like texture.

TABLE 2

Comparison of Caseinless Cream Cheese Produced from 100 Percent Whey Protein under Different Heating Conditions*

| | Sample A | Sample B |
| --- | --- | --- |
| pH | 4.66 | 4.67 |
| Moisture (%) | 68.1 | 69.8 |
| Cold viscosity (Pa) | 3454 | 3470 |

*Moisture of the samples was determined by microwave oven test at 80% power level. Data are mean values of duplicate measurements.

EXAMPLE 2

This examples illustrate the preparation of a soy protein-based cream cheese-like product. The following procedure was used.

(1) Mix 1.362 kg of soy protein isolate (Supro 670, Protein Technology International, St. Louis), 12.7 kg hot water (abut 140 to about 150° F.), and 4.1 kg melted anhydrous butter fat;
(2) Homogenize the mixture with a two-stage homogenizer (first stage at 4,000 psi and second stage at 500 psi);
(3) Heat the homogenized sample to 180° F. and hold for 20 minutes;
(4) Add 100.0 g lactic acid (88%) to the heated mixture to adjust the pH to below 5.0;
(5) Add 30 g of cream cheese flavoring and mix;
(6) Divide the resulting into three portions;
(7) Add 33.3 g NaCl to the first portion to form sample A and mix;
(8) Add 33.3 g NaCl and 15.1 g locus bean gum to form sample B and mix;
(9) Add 33.3 g NaCl and 15.1 g carrageenan gum to form sample C and mix;
(10) Homogenize each of samples A, B, and C using a two-stage homogenizer (first state at 5,000 psi and second stage at 500 psi);
(11) Hot fill the homogenized samples in cups and seal; and
(12) Store the hot filled samples at 40° F.

The details of the preparation of samples A, B, and C are summarized in Table 3 below.

TABLE 3

Experimental Design

| Ingredient | Amount | | |
| --- | --- | --- | --- |
| SPI (Soy Protein Isolate) | 1.362 kg | | |
| Anhydrous butter fat | 4.086 kg | | |
| Hot water (about 160° F.) | 12.712 kg | | |
| Lactic acid (88%) | 100 g | | |
| Flavoring | 30 g | | |
| Ingredient | Sample A | Sample B | Sample C |
| Salt (NaCl) | 33.3 g | 33.3 g | 33.3 g |
| Locust Bean Gum | — | — | 15.1 g |
| Carrageenan Gum | — | 15.1 g | — |

The results are summarized in Table 4. Overall, excellent products were obtained. Although these products contained 100 percent soy proteins (with no dairy protein), they had smooth cream cheese-like textures. At the designed protein level (formula target: 6.3 percent total soy protein, 22.5 percent fat, 68 percent moisture), cold viscosities of each sample were over 1,500 Pa. Increasing the level of total soy proteins is expected to provide firmer products. The addition of gums did not significantly effect viscosity; smoothness did, however, increase and syneresis was substantially reduced. Even without the addition of any colorant, the overall color is acceptable. Results of an informal group sensory evaluation indicated an absence of significant beany flavor, smooth texture (especially for sample C using locust bean gum) texture, and no after-taste or off-flavor.

The syneresis of all prototypes produced are very low, indicating a well established stable system. Even without the addition of gum, the rate of syneresis was only about 2.4 percent during a five hour incubation at room temperature. With the addition of locust bean gum, the rate of syneresis was essentially 0 percent after five hours at room temperature, indicating an excellent textural stability. A summary of the properties of the three samples is given in Table 4 below.

TABLE 4

Effect of Added Gum on Product Texture*

| Samples | Sample A | Sample B | Sample C |
|---|---|---|---|
| Moisture (%) | 68.2 | 67.5 | 67.7 |
| pH | 4.68 | 4.72 | 4.71 |
| Cold Viscosity (Pa) | 1645 | 1710 | 1667 |
| Syneresis (5 hours at 77° F.) | 2.4% | 0.4% | 0.0% |

*Moisture of the samples was determined by microwave oven test at 80% power level. Data are mean values of triplicate measurements.

What is claimed is:

1. A method for making a cream cheese-like product, the method comprising:

mixing a non-casein protein, a fat, and water to form a mixture;

subjecting the mixture to a first homogenization to form a protein matrix stabilized emulsion system;

heating the protein matrix stabilized emulsion system to a temperature and for a time effective to denature the proteins to form a denatured protein matrix stabilized emulsion;

adjusting the pH of the denatured protein matrix stabilized emulsion to about 4 to about 6;

subjecting the pH-adjusted emulsion to a second homogenization to form the cream cheese-like product; and packaging the cream cheese-like product.

2. The method as recited in claim 1, wherein the protein matrix stabilized emulsion system is heated to a temperature of about 155° F. to about 195° F. for about 5 to about 80 minutes.

3. The method as recited in claim 1, wherein the first homogenization is carried out in a two-stage homogenizer wherein a first stage is at a pressure of about 1,000 to about 5,000 psi and a second stage is at a pressure of about 300 to about 1,000 psi.

4. The method as recited in claim 1, wherein the second homogenization is carried out in a two-stage homogenizer wherein a first stage is at a pressure of about 1,500 to about 6,000 psi and a second stage is at a pressure of about 300 to 1,000 psi.

5. The method as recited in claim 1, wherein the cream cheese-like product is packaged using hot packing techniques and then cooled to refrigeration temperatures.

6. A method for making a cream cheese-like product which is substantially free of casein, the method comprising:

mixing non-casein protein, fat, and water to provide an aqueous protein and fat blend, wherein the non-casein protein is soy protein, whey protein, legume protein, egg protein, animal protein, or mixtures thereof;

subjection the aqueous protein and fat blend to a first homogenization to provide a protein matrix stabilized emulsion;

heating the protein matrix stabilized emulsion for a time and temperature sufficient to denature the non-casein protein to form a denatured protein matrix stabilized emulsion;

adjusting the pH of the denatured protein matrix stabilized emulsion to about 4 to about 6;

subjecting the pH-adjusted emulsion to a second homogenization to form the cream cheese-like product;

hot packing the cream cheese-like product; and cooling the cream cheese-like product to refrigeration temperatures.

7. The method as recited in claim 6, wherein the temperature at which the protein matrix stabilized emulsion is heated is about 155° F. to about 195° F. and the time for which protein matrix stabilized emulsion is about 5 to about 80 minutes.

8. The method as recited in claim 7, wherein the first homogenization is carried out in a two-stage homogenizer wherein a first stage is at a pressure of about 1,000 to about 5,000 psi and a second stage is at a pressure of about 300 to about 1,000 psi.

9. The method as recited in claim 8, wherein the second homogenization is carried out in a two-stage homogenizer wherein a first stage is at a pressure of about 1,500 to about 6,000 psi and a second stage is at a pressure of about 300 to 1,000 psi.

10. The method as recited in claim 9, wherein the cream cheese-like product contains about 0.01 to about 2 percent gum.

11. The method as recited in claim 9, wherein the non-casein protein is soy protein.

12. The method as recited in claim 9, wherein the non-casein protein is whey protein.

13. The method as recited in claim 9, wherein the non-casein protein is the mixture of soy protein and whey protein.

14. The method as recited in claim 11, wherein the soy protein is soy protein isolate.

* * * * *